United States Patent
Paulduro et al.

(10) Patent No.: US 10,488,086 B2
(45) Date of Patent: Nov. 26, 2019

(54) DOMESTIC REFRIGERATION APPLIANCE WITH A REFRIGERANT CIRCUIT, AND METHOD FOR OPERATING A DOMESTIC REFRIGERATION APPLIANCE WITH A REFRIGERANT CIRCUIT

(71) Applicant: BSH HAUSGERAETE GMBH, Munich (DE)

(72) Inventors: Achim Paulduro, Albeck (DE); Tommy Beckmann, Hilzingen (DE); Christoph Spiegel, Kempten (DE); Moritz Klein, Giengen (DE)

(73) Assignee: BSH Hausgeraete GmbH, Munich (DE)

( * ) Notice: Subject to any disclaimer, the term of this patent is extended or adjusted under 35 U.S.C. 154(b) by 94 days.

(21) Appl. No.: 15/753,602

(22) PCT Filed: Aug. 15, 2016

(86) PCT No.: PCT/EP2016/069344
§ 371 (c)(1),
(2) Date: Feb. 20, 2018

(87) PCT Pub. No.: WO2017/032630
PCT Pub. Date: Mar. 2, 2017

(65) Prior Publication Data
US 2018/0238595 A1    Aug. 23, 2018

(30) Foreign Application Priority Data
Aug. 21, 2015   (DE) ................. 10 2015 215 972

(51) Int. Cl.
*F25B 31/02*    (2006.01)
*F25B 49/02*    (2006.01)
(Continued)

(52) U.S. Cl.
CPC .......... *F25B 31/023* (2013.01); *F25B 49/022* (2013.01); *F25B 49/025* (2013.01);
(Continued)

(58) Field of Classification Search
CPC .... F25B 31/023; F25B 49/022; F25B 49/025; H02P 21/18; H02P 6/18; H02P 27/06
See application file for complete search history.

(56) References Cited

U.S. PATENT DOCUMENTS 6,806,676 B2   10/2004  Papiernik et al.
2015/0311845 A1*  10/2015  Nagata ................ H02P 21/0021
                                                    318/400.02

FOREIGN PATENT DOCUMENTS

DE           10206191 A1    6/2003
DE      102012006492 A1    10/2012
(Continued)

*Primary Examiner* — Marc E Norman
(74) *Attorney, Agent, or Firm* — Laurence A. Greenberg; Werner H. Stemer; Ralph E. Locher

(57) ABSTRACT

A domestic refrigeration appliance includes an insulated body with a coolable container delimiting a coolable space for food, a refrigerant circuit having a coolant and a compressor for cooling the space, and an electronic control apparatus and an electric drive with a three-phase AC synchronous motor and a control element or inverter for activating the motor. The compressor includes a chamber with an inlet and with an outlet, a piston mounted displaceably within the chamber, a crankshaft and the motor. The motor has a number of pole pairs greater than 1, a stator and a rotor mounted rotatably relative to the stator and coupled to the piston by the crankshaft. During compressor operation, the motor causes the piston to reduce the size of a volume enclosed by the compressor chamber and the piston to compress the coolant. A method for operating a domestic refrigeration appliance is also provided.

13 Claims, 4 Drawing Sheets

(51) Int. Cl.
*H02P 6/18* (2016.01)
*H02P 21/18* (2016.01)
*H02P 27/06* (2006.01)

(52) U.S. Cl.
CPC ............... *H02P 6/18* (2013.01); *H02P 21/18* (2016.02); *H02P 27/06* (2013.01)

(56) References Cited

FOREIGN PATENT DOCUMENTS

| | | | |
|---|---|---|---|
| EP | 0784378 | A2 | 7/1997 |
| EP | 1277959 | A2 | 1/2003 |
| EP | 1473823 | A2 | 11/2004 |
| EP | 2669519 | A1 | 12/2013 |
| JP | 2014079041 | A | 5/2014 |

* cited by examiner

DOMESTIC REFRIGERATION APPLIANCE WITH A REFRIGERANT CIRCUIT, AND METHOD FOR OPERATING A DOMESTIC REFRIGERATION APPLIANCE WITH A REFRIGERANT CIRCUIT

BACKGROUND OF THE INVENTION

Field of the Invention

The present invention relates to a domestic refrigeration appliance with a refrigerant circuit and a method for operating a domestic refrigeration appliance with a refrigerant circuit.

Domestic refrigeration appliances comprise a coolable interior space for storing food and a refrigerant circuit for cooling the coolable interior space. The refrigerant circuit comprises a compressor, a condenser connected downstream of the compressor, a throttle apparatus connected downstream of the condenser and an evaporator arranged between the throttle apparatus and the compressor.

EP 2 669 519 A1 discloses a reciprocating compressor and an electronic control apparatus, which activates the reciprocating compressor in such a manner that when the reciprocating compressor is switched off, its electric motor generates a braking torque below a predetermined speed.

DE 10 2012 006 492 A1 discloses a sensorless rotor position determination for an electric motor, which is connected to a cyclically repeating load, for example a compressor.

SUMMARY OF THE INVENTION

It is the object of the invention to specify a method for operating a domestic refrigeration appliance with a refrigerant circuit, the compressor of which is operated more efficiently. It is a further object of the invention to specify a correspondingly embodied domestic refrigeration appliance.

The object of the invention is achieved by a method for operating a domestic refrigeration appliance, which has a heat-insulated body with a coolable inner container, which delimits a coolable interior space provided to store food, a refrigerant circuit provided to cool the coolable interior space with a coolant and a compressor, and an electric drive, the electric drive having a three-phase AC synchronous motor and a control element, which is configured in particular as an inverter, for activating the three-phase AC synchronous motor and the compressor has a compressor chamber with an inlet and an outlet, a piston mounted in a displaceable manner within the compressor chamber, a crankshaft and the three-phase AC synchronous motor of the electric drive, the three-phase AC synchronous motor comprising a number P of pole pairs greater than 1, a stator and a rotor that is coupled to the piston by way of the crankshaft and mounted in such a manner that it can rotate in relation to the stator, so that when the compressor operates, the piston is able to reduce a volume enclosed by the compressor chamber and piston by means of the three-phase AC synchronous motor, in order to compress the coolant, having the following method steps for determining the position of the piston relative to the compressor chamber during operation of the compressor in the intended manner:

Determining the greatest absolute value of at least one instantaneous value, preferably the instantaneous value of at least one of the electric phase currents of the three-phase AC synchronous motor, for at least one full rotation of the rotor relative to the stator, Determining the angular position of the rotor relative to the stator assigned to the determined at least one instantaneous value, and Determining the position of the piston relative to the compressor chamber based on the speed of the three-phase AC synchronous motor and the angular position of the rotor assigned to the determined instantaneous value.

The object of the invention is also achieved by a domestic refrigeration appliance, having a heat-insulated body with a coolable inner container, which delimits a coolable interior space provided to store food, a refrigerant circuit provided to cool the coolable interior space with a coolant and a compressor, an electronic control apparatus and an electric drive, which has a three-phase AC synchronous motor and a control element, which is configured in particular as an inverter, for activating the three-phase AC synchronous motor, the compressor having a compressor chamber with an inlet and an outlet, a piston mounted in a displaceable manner within the compressor chamber, a crankshaft and the three-phase AC synchronous motor, the three-phase AC synchronous motor comprising a number P of pole pairs greater than 1, a stator and a rotor that is coupled to the piston by way of the crankshaft and mounted in such a manner that it can rotate in relation to the stator, so that when the compressor operates, the piston is able to reduce a volume enclosed by the compressor chamber and piston by means of the three-phase AC synchronous motor, in order to compress the coolant, and the electronic control apparatus is designed to activate the electric drive according to the inventive method.

The inventive domestic refrigeration appliance comprises the heat-insulated body with the inner container, which delimits the coolable interior space. The coolable interior space is provided for storing food and is cooled by means of the refrigerant circuit.

The coolable interior space can preferably be closed by means of a door leaf. The door leaf is preferably mounted in such a manner that it can pivot about an axis that preferably runs vertically. The coolable interior space is accessible in the opened state.

The refrigerant circuit per se is known in principle to the person skilled in the art and comprises the compressor and in particular a condenser connected downstream of the compressor, a throttle apparatus connected downstream of the condenser and an evaporator, which is arranged between the throttle apparatus and the compressor.

The compressor comprises the volume enclosed by the compressor chamber and the piston, said volume being reduced by the movement of the piston when the compressor operates, in order to compress the coolant.

The piston is mounted in a displaceable manner within the compressor chamber and is driven by means of the three-phase AC synchronous motor by way of the piston. Such a compressor is generally referred to as a reciprocating compressor.

The three-phase AC synchronous motor is in particular a permanently excited three-phase AC synchronous motor, preferably a brushless DC motor. The three-phase AC synchronous motor comprises a number P of pole pairs greater than 1, preferably at least 3.

When the compressor operates, the three-phase AC synchronous motor is operated in particular at a speed determined or predefined by the electronic control apparatus or a temperature regulator. The three-phase AC synchronous motor is therefore part of the electric drive, which is preferably embodied as a speed-regulated electric drive. The speed-regulated electric drive preferably comprises a field-oriented regulator for an improved regulating response.

A field-oriented regulator generally forms a cascade structure with internal current regulation circuits, overlaid with an external speed regulation circuit.

Reciprocating compressors have a characteristic torque curve. This can be a function of the load point or even the speed of the three-phase AC synchronous motor. Mechanical properties of the compressor, for example an inertia torque of rotating components of the compressor, can also impact on the operation of the three-phase AC synchronous motor.

As the coolable interior space is cooled, the refrigerant circuit and therefore the electric drive or the three-phase AC synchronous motor are operated. This causes the rotor to rotate relative to the stator, causing the piston to move to and fro within the compressor chamber. The position of the piston relative to the compressor chamber changes as a result.

When the piston is in a specific position relative to the compressor chamber, the volume is at a minimum. This specific position is generally referred to as the top dead center.

When the piston is in a further specific position relative to the compressor chamber, the volume is at a maximum. This further specific position is generally referred to as the bottom dead center.

When the three-phase AC synchronous motor moves the piston from its specific position, in other words from its top dead center, to its further specific position, in other words to its bottom dead center, the volume increases and the compressor sucks in coolant through its inlet.

When the three-phase AC synchronous motor moves the piston from its further specific position, in other words from its bottom dead center, to its specific position, in other words to its top dead center, the volume reduces and the compressor compresses the coolant present in the compressor chamber, until the outlet opens at the top dead center so that the compressed coolant can pass to the condenser.

During a complete movement of the piston, in other words a movement of the piston such that it passes through all possible positions relative to the compressor chamber, the three-phase AC synchronous motor performs a complete rotation, in other words the rotor rotates through 360° relative to the stator.

As the three-phase AC synchronous motor performs a complete rotation, it generates a torque M as a function of the position of the piston. The torque M is essentially periodic and is at a maximum, when the piston is in its specific position, in other words at the top dead center, or at least close to the specific position, and drops once the outlet has opened.

The electric currents provided to operate the three-phase AC synchronous motor are the phase currents, the current strengths of which are a function of the torque M. It is thus possible to identify the top dead center based on an evaluation of the phase currents, or at least one of the phase currents, at least for a full rotation of the rotor relative to the stator, in order then to determine the corresponding angular position of the rotor relative to the stator.

According to the invention the greatest absolute value of the instantaneous value of at least one of the electric phase currents is determined.

To reduce the computation outlay when determining the angular position for example, the inventive method can feature the following method steps:

Dividing an overall angular range assigned to a complete rotation of the rotor into P consecutive angular sectors of equal size, Determining the greatest absolute value of the instantaneous value of at least one of the electric phase currents of the three-phase AC synchronous motor for at least one full rotation of the rotor relative to the stator, Determining the angular sector to which the determined instantaneous value is assigned, and Using the determined angular sector to determine the angular position of the rotor relative to the stator assigned to the determined instantaneous value.

Just one of the phase currents of the three-phase AC synchronous motor is preferably used to determine the angular sector, in order in particular to reduce the computation outlay for determining the angular position.

The curve of the phase current used or the curves of the phase currents used can be divided into P1 to Px angular sectors based on the number of pole pairs of the three-phase AC synchronous motor for a complete mechanical rotation of the rotor, in other words for a rotation through 360°. "x" here is the number P of pole pairs. The method steps set out above therefore allow determination of the angular sector to which the top dead center is assigned.

Provision can be made for example for the angle, which forms the boundary between the determined angular sector and its preceding angular sector, to be used as the angular position of the rotor relative to the stator assigned to the determined instantaneous value.

When the piston is in a defined position relative to the rotor, the angular sectors relative to the angular position of the rotor are known and when the offset angle between the angle assigned to said boundary and the angular position of the rotor is known for the specific position, in other words the top dead center, the required angular position can be calculated more precisely by means of the speed of the three-phase AC synchronous motor and a time measurement.

If this is not the case, the following can be performed to determine the angular position more precisely:

Determining the greatest absolute values of the instantaneous values for at least two of the electric phase currents of the three-phase AC synchronous motor just for the determined angular sector, and Determining the angular position of the rotor relative to the stator assigned to the position of the piston based on the determined instantaneous values.

Detailed identification can thus be performed based on the known speed and for example the amplitude differences of the phase currents without an additional sensor for such more precise identification of the rotor position.

According to one embodiment of the inventive method, in which the electric drive is a speed-regulated electric drive with a field-oriented regulator, the following can be performed: increasing the target current strength predetermined by the field-oriented regulator for the three-phase AC synchronous motor by a predefined value apart from for the angular sector to which the determined instantaneous value is assigned. This reduces any fluctuation of the current strength of the phase currents, allowing the speed to fluctuate less during a complete rotation of the rotor. This improves the smooth running of the compressor. This is the case particularly at relatively low speeds and can result in improved compressor running characteristics.

In order to improve the stopping of the running compressor, provision can be made for activation of the three-phase AC synchronous motor such that it slows to a stop within less than a ¾ rotation of the three-phase AC synchronous motor, preferably at least within roughly a half rotation of the three-phase AC synchronous motor, starting when the piston is in a position relative to the compressor chamber, which is assigned to the angular position of the rotor relative to the stator assigned to the determined instantaneous value.

Before the three-phase AC synchronous motor slows down, the speed of the three-phase AC synchronous motor is preferably reduced to a minimum speed for example in a ramped manner.

This results in a position-dependent stop, which starts when the piston reaches the top dead center. This reduces stopping noise. The piston can also optionally take up a subsequent position after the stop in order to prevent valve leaks for example.

BRIEF DESCRIPTION OF THE SEVERAL VIEWS OF THE DRAWING

An exemplary embodiment of the invention is illustrated by way of example in the accompanying schematic drawings, in which.

DESCRIPTION OF THE INVENTION

Figure 1:
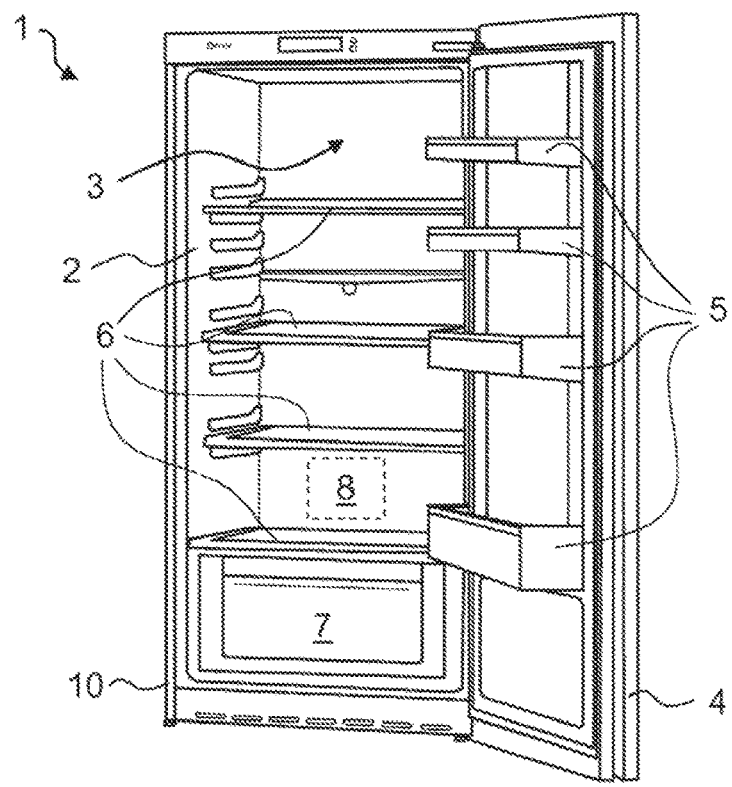
FIG. 1 shows a perspective view of a domestic refrigeration appliance.

FIG. 1 shows a perspective view of a domestic refrigeration appliance 1, which comprises a heat-insulated body 10 with an inner container 2, which delimits a coolable interior space 3. The coolable interior space 3 is provided for storing food (not shown in detail).

In the present exemplary embodiment the domestic refrigeration appliance 1 has a pivotable door leaf 4 for closing the coolable interior space 3. The door leaf 4 is mounted in particular in such a manner that it can pivot about a vertical axis. When the door leaf 4 is opened, as shown in FIG. 1, the coolable interior space 3 is accessible.

In the present exemplary embodiment a number of door trays 5 for storing food are arranged on the side of the door leaf 4 facing in the direction of the coolable interior space 3. A number of shelves 6 for storing food are arranged in particular in the coolable interior space 3 and a drawer 7 in particular, in which food can also be stored, is arranged in the lower region of the coolable interior 3.

Figure 2:
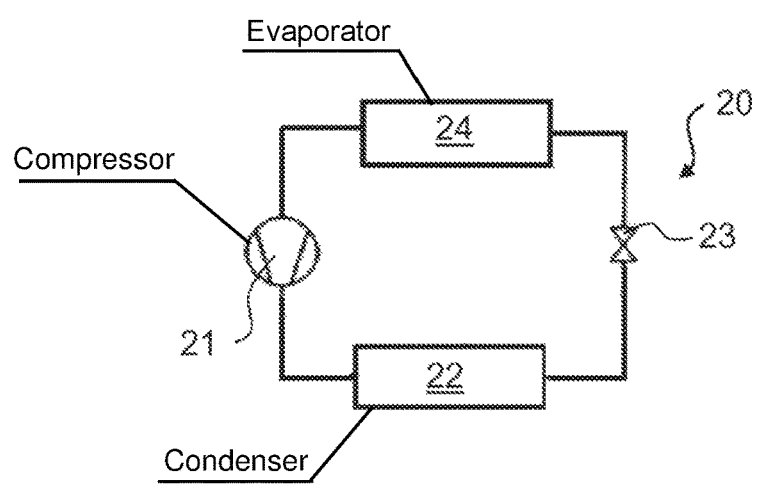
FIG. 2 shows a refrigerant circuit of the domestic refrigeration appliance with a compressor.

The domestic refrigeration appliance 1 comprises a refrigerant circuit 20 for cooling the coolable interior space 3, as shown in FIG. 2. In the present exemplary embodiment the refrigerant circuit 20 comprises a coolant (not shown in detail but known in principle to the person skilled in the art), a compressor 21, a condenser 22 connected downstream of the compressor 21, a throttle apparatus 23 connected downstream of the condenser 22, said throttle apparatus 23 being embodied in particular as a restrictor or capillary tube, and an evaporator 24, which is arranged between the throttle apparatus 23 and the compressor 21. The compressor 21 is preferably arranged within a machine space of the domestic refrigeration appliance 1, located in particular behind the drawer 7.

Figure 3:
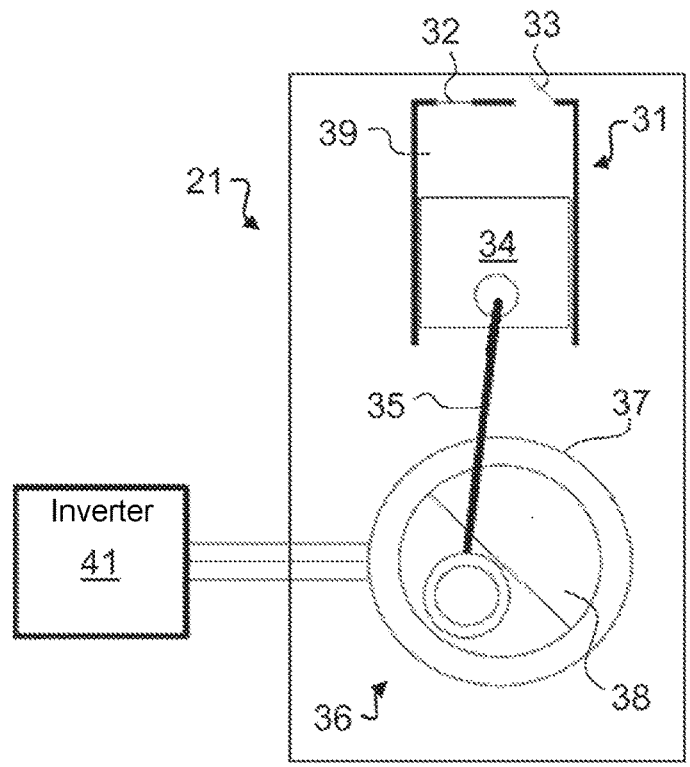
FIG. 3 shows the compressor.

The compressor 21 is embodied as a reciprocating compressor and is shown in more detail in FIG. 3.

The compressor 21 comprises a compressor chamber 31 with an inlet 32 and an outlet 33 for the refrigerant and a piston 34 mounted in a displaceable manner within the compressor chamber 31. The inlet 32 and outlet 33 are each provided with corresponding valves, as known in principle to the person skilled in the art.

The compressor 21 comprises a crankshaft 35 and a three-phase AC synchronous motor 36.

The three-phase AC synchronous motor 36 is in particular a permanently excited three-phase AC synchronous motor, preferably a brushless DC motor, and comprises a stator 37 and a rotor 38, which is mounted in such a manner that it can rotate relative to the stator 37. One of the ends of the crankshaft 35 is coupled to the piston 34 and the other end of the crankshaft 35 is coupled to the rotor 38 of the three-phase AC synchronous motor 36, so that during operation of the domestic refrigeration appliance 1 or compressor 21 in the intended manner, the piston 34 is able to reduce a volume 39 enclosed by the compressor chamber 31 and the piston 34 by means of the three-phase AC synchronous motor 36, in order to compress the coolant.

In the present exemplary embodiment the domestic refrigeration appliance 1 comprises an electronic control apparatus 8, which is designed to activate the refrigerant circuit 20, in particular the compressor 21 of the refrigerant circuit 20, in such a manner that the coolable interior space 3 is at least roughly at a predefined or predefinable target temperature. The electronic control apparatus 8 is preferably designed such that it regulates the temperature of the coolable interior space 3. In order optionally to determine the actual temperature of the coolable interior space 3, the domestic refrigeration appliance 1 can have at least one temperature sensor (not shown in detail) connected to the electronic control apparatus 8.

Figure 4:
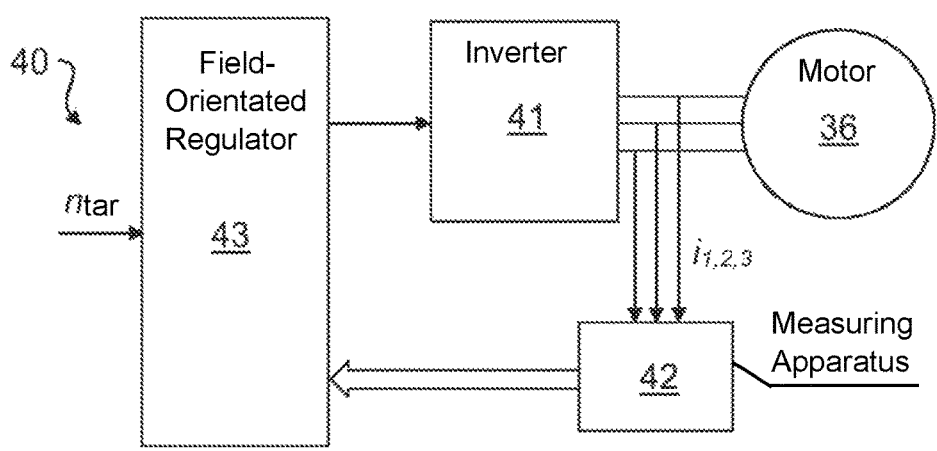
FIG. 4 shows an electric drive of the domestic refrigeration appliance with field-oriented regulation.

In order to activate or regulate the refrigerant circuit 20, in the present exemplary embodiment the domestic refrigeration appliance 1 comprises a regulated electric drive 40, as shown in FIG. 4, comprising the three-phase AC synchronous motor 36 of the compressor 21. The three-phase AC synchronous motor 36 is driven at a target speed $n_{tar}$ predefined by the electronic control apparatus 8 as required. The target speed $n_{tar}$ is calculated or predefined in particular by the electronic control apparatus 8 based on an intended cooling of the coolable interior space 3, for example based on the current temperature and target temperature of the coolable interior space 3.

The electric drive 40 comprises a control element for driving the three-phase AC synchronous motor 36. The control element is embodied as an inverter 41 and during operation of the electric drive 40 generates a three-phase voltage, the fundamental oscillation of which has an amplitude and a basic frequency f, which is an indirect function of the target speed $n_{tar}$ and an actual speed of the three-phase AC synchronous motor 36.

The three-phase AC synchronous motor 36 has a number P of pole pairs greater than 1, so the actual speed n is equal to f/P.

In the present exemplary embodiment the number P of pole pairs is equal to 3.

In the present exemplary embodiment the regulated electric drive 40 has a measuring apparatus 42, which is used to measure the electric phase currents $i_{1,2,3}$ of the three-phase AC synchronous motor 36, and the actual speed of the three-phase AC synchronous motor 36 is determined. The measuring apparatus 42 optionally preprocesses the determined actual speed and the measured electric phase currents $i_{1,2,3}$ of the three-phase AC synchronous motor 36, so that the determined actual speed and the measured electric phase currents $i_{1,2,3}$ of the three-phase AC synchronous motor 36 can be processed by a regulator of the electric drive 40 in a suitable form. As provided for in the present exemplary embodiment, the actual speed can be determined for example from the measured phase currents $i_{1,2,3}$. However the actual speed can also be measured directly by means of an appropriate sensor.

In the present exemplary embodiment the regulation of the regulated electric drive 40 is based on the field-oriented regulator 43. The field-oriented regulator 43 forms a cascade structure with internal current regulation circuits, overlaid with an external speed regulation circuit.

As the coolable interior space 3 is cooled, the refrigerant circuit 20 and therefore the electric drive 40 or the three-phase AC synchronous motor 36 are operated. This causes the rotor 38 to rotate relative to the stator 37, causing the piston 34 to move to and fro within the compressor chamber 39. The position of the piston 34 relative to the compressor chamber 39 changes as a result.

When the piston 34 is in a specific position relative to the compressor chamber 39, the volume 39 is at a minimum. This specific position is generally referred to as the top dead center.

When the piston 34 is in a further specific position relative to the compressor chamber 39, the volume 39 is at a maximum. This further specific position is generally referred to as the bottom dead center.

When the three-phase AC synchronous motor 36 moves the piston 34 from its specific position, in other words from its top dead center, to its further specific position, in other words to its bottom dead center, the volume 39 increases and the compressor 21 sucks in coolant through its inlet 32.

When the three-phase AC synchronous motor 36 moves the piston 34 from its further specific position, in other words from its bottom dead center, to its specific position, in other words to its top dead center, the volume 39 reduces and the compressor 21 compresses the coolant present in the compressor chamber 31, until the outlet 33 opens at the top dead center so that the compressed coolant can pass to the condenser 22.

During a complete movement of the piston 34, in other words a movement of the piston 34 such that it passes through all possible positions relative to the compressor chamber 31, the three-phase AC synchronous motor 36 performs a complete rotation, in other words the rotor 38 rotates through 360° relative to the stator 37.

Figure 5:
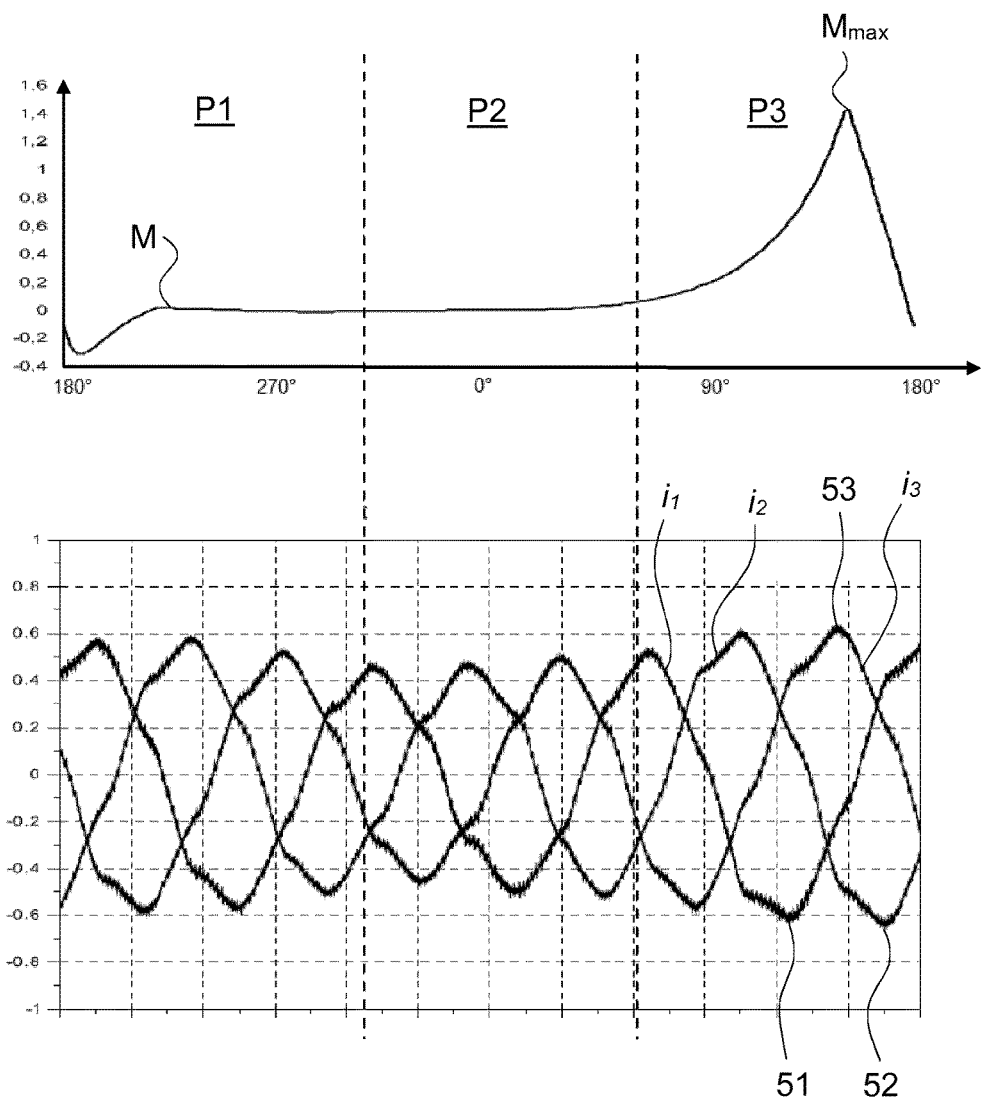
FIG. 5 shows motor currents of a three-phase AC synchronous motor of the compressor and the torque applied by the three-phase AC synchronous motor.

As the three-phase AC synchronous motor 36 performs a complete rotation, it generates a torque M as a function of the position of the piston 34, as shown graphically in FIG. 5. The torque M is essentially periodic and is at a maximum (maximum torque $M_{max}$), when the piston 43 is in its specific position, in other words at the top dead center, or at least close to the specific position, and drops once the outlet 33 has opened.

For a complete rotation of the three-phase AC synchronous motor 36 the electric phase currents $i_{1,2,3}$ operate periodically. The electric phase currents $i_{1,2,3}$ of the three-phase AC synchronous motor 36 operate at least approximately according to the torque M of the three-phase AC synchronous motor 36 to be applied. These are also shown in FIG. 5.

In the present exemplary embodiment the electronic control apparatus 8 is embodied such that it performs the method described in the following for operating the domestic refrigeration appliance 1, in order to determine the position of the piston 34 relative to the compressor chamber 31 during operation of the compressor 21 in the intended manner.

In particular during the first rotations of the three-phase AC synchronous motor 36 after the start of a cooling phase for the coolable interior space 3 the electronic control apparatus 8 determines the greatest absolute value of the instantaneous values 51, 52, 53 of at least one of the electric phase currents $i_{1,2,3}$ of the three-phase AC synchronous motor 36 at least for a full rotation of the rotor 38 relative to the stator 37. The electronic control apparatus 8 then determines the angular position of the rotor 38 relative to the stator 37 assigned to the determined instantaneous value 52. The electronic control apparatus 8 is then able, based on the speed of the three-phase AC synchronous motor 36 and the angular position of the rotor 38 assigned to the determined instantaneous value 52, to determine the position of the piston 34 relative to the compressor chamber 31 during operation of the compressor 21 in the intended manner.

Figure 6:
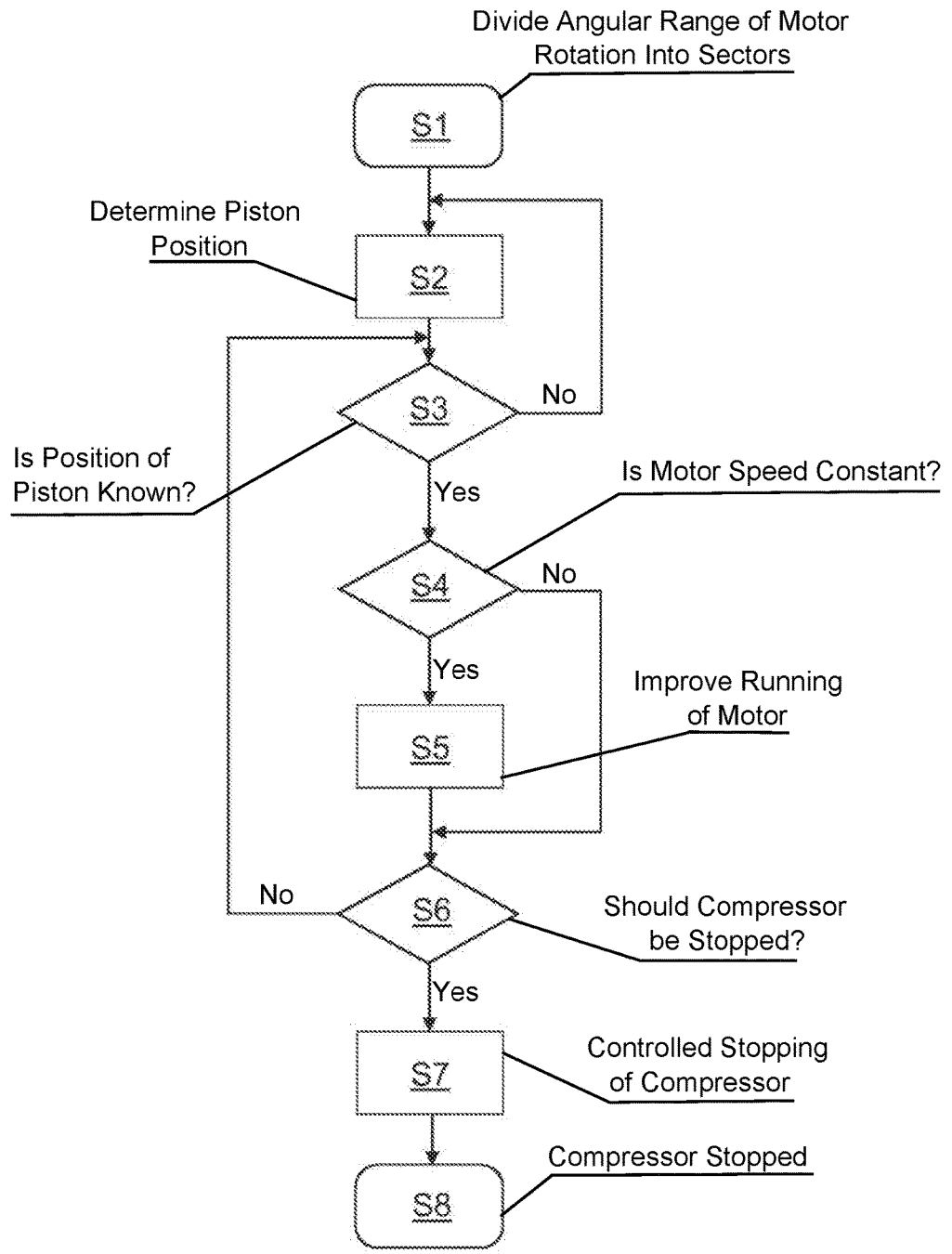
FIG. 6 shows a flow diagram to illustrate the operation of the domestic refrigeration appliance.

The following in particular is performed to determine the position of the piston 34 relative to the compressor chamber 31. This method is summarized in a flow diagram illustrated in FIG. 6.

First an overall angular range of 360° assigned to a complete rotation of the rotor 38 is divided into P consecutive angular sectors P1, P2, P3 of equal size. This can be done for example before or after the compressor 21 starts, step S1 of the flow diagram.

To determine the position of the piston 34, step S2 of the flow diagram, the greatest absolute value of the instantaneous value 52 of just one of the electric phase currents $i_2$ of the three-phase AC synchronous motor 36 for at least one full rotation of the rotor 38 relative to the stator 37 is then used to determine the angular sector P3, in which this greatest instantaneous value 52 is located. The determined angular sector P3 is used to determine the angular position of the rotor 38 relative to the stator 37 assigned to the determined instantaneous value 53. Step S2 is repeated as long as the position of the piston 34 is not known, step S3 of the flow diagram.

In the present exemplary embodiment the angle, which forms the boundary between the determined angular sector P3 and its preceding angular sector P2, is first used as the angular position of the rotor 38 relative to the stator 37 assigned to the determined instantaneous value.

When the piston 34 is in a defined position relative to the rotor 38, the angular sectors P1, P2, P3 relative to the angular position of the rotor 38 are known and when the offset angle between the angle assigned to said boundary and the angular position of the rotor 38 is known for the specific position, in other words the top dead center, the required angular position can be calculated by means of the speed of the three-phase AC synchronous motor 36 and a time measurement.

In the present exemplary embodiment the overall angular range is selected arbitrarily. Also the piston 34 does not have a defined position relative to the rotor 38.

In the present exemplary embodiment, to determine the position of the piston 34, the greatest absolute values of the instantaneous values 51, 52, 53 for at least two of the electric phase currents, preferably for all three electric phase currents $i_{1,2,3}$ of the three-phase AC synchronous motor 36, are determined just for the determined angular sector P3, in order to determine the angular position of the rotor 38 relative to the stator 37 assigned to the position of the piston 34 more precisely based on the determined instantaneous values 51, 52, 53.

In the present exemplary embodiment the values of the absolute values of the instantaneous values 51, 52, 53 increase continuously in the determined angular sector P3. This means that the specific position, in other words the top dead center, is located between the last instantaneous value 52 within the determined angular sector P3 and the boundary with the next angular sector P1.

In the present exemplary embodiment the electronic control apparatus 8 can be designed to facilitate or assist the field-oriented regulator 43 of the electric drive 30. Provision can thus be made for the actual speed of the three-phase AC synchronous motor 36 to be evaluated to ensure that it is as constant as possible, step S3 of the flow diagram. If this is not the case, the smooth running of the three-phase AC synchronous motor 36 can be improved, step S4 of the flow diagram.

In the present exemplary embodiment the smooth running of the three-phase AC synchronous motor 36 is improved such that the target current strength predetermined by the field-oriented regulator 34 for the three-phase AC synchronous motor 36 is increased by a predefined value apart from for the angular sector P3 to which the determined instantaneous value 52 is assigned, step S5 of the flow diagram.

If the running compressor 21 should be stopped, for example due to temperature regulation, step S6 of the flow diagram, provision can then be made for controlled stopping of the compressor 21, step S7 of the flow diagram. This can take place as follows, controlled by the electronic control apparatus 8:

The speed of the three-phase AC synchronous motor 36 is first reduced to a minimum speed. This is done continuously for example, preferably in a ramped manner.

The three-phase AC synchronous motor 36 is then activated in such that it slows to a stop within less than a ¾ rotation of the three-phase AC synchronous motor 36, preferably at least within roughly a half rotation of the three-phase AC synchronous motor 36. This process starts when the piston 34 is in a position relative to the compressor chamber 31, which is assigned to the angular position of the rotor 38 relative to the stator 37 assigned to the determined instantaneous value 52, in other words when the piston 34 is at its top dead center.

The compressor 21 is then stopped, step S8 of the flow diagram.

LIST OF REFERENCE CHARACTERS

1 Domestic refrigeration appliance
2 Inner container
3 Coolable interior space
4 Door leaf
5 Door tray
6 Shelves
7 Drawer
8 Electronic control apparatus
10 Body
20 Refrigerant circuit
21 Compressor
22 Condenser
23 Throttle apparatus
24 Evaporator
31 Compressor chamber
32 Inlet
33 Outlet
34 Piston
35 Crankshaft
36 Three-phase AC synchronous motor
37 Stator
38 Rotor
39 Volume
40 Electric drive
41 Inverter
42 Measuring apparatus
43 Field-oriented regulator
51, 52, 53 Instantaneous value
$i_{1,2,3}$ Phase currents
$n_{tar}$ Target speed
M Torque
$M_{max}$ Maximum torque
P Number of pole pairs
P1, P2, P3 Angular sector
S1-S8 Steps

The invention claimed is:

1. A method for operating a domestic refrigeration appliance, the method comprising the following steps:
providing a heat-insulated body with a coolable inner container delimiting a coolable interior space for storing food;
providing a refrigerant circuit for cooling the coolable interior space, the refrigerant circuit having a coolant, a compressor, and an electric drive, the electric drive having a three-phase AC synchronous motor and a control element for activating the three-phase AC synchronous motor, the compressor having a compressor chamber with an inlet and an outlet, a piston displaceably mounted within the compressor chamber, a crankshaft and the three-phase AC synchronous motor of the electric drive, the three-phase AC synchronous motor including a number P of pole pairs greater than 1, a stator and a rotor being coupled to the piston by the crankshaft and mounted for rotation relative to the stator, permitting the three-phase AC synchronous motor to cause the piston to reduce a volume enclosed by the compressor chamber and the piston to compress the coolant during operation of the compressor;
determining a position of the piston relative to the compressor chamber during operation of the compressor in an intended manner by:
determining a greatest absolute value of at least one instantaneous value of at least one electric phase current of the three-phase AC synchronous motor, for at least one full rotation of the rotor relative to the stator,
determining an angular position of the rotor relative to the stator assigned to the determined instantaneous value, and
determining the position of the piston relative to the compressor chamber based on a speed of the three-phase AC synchronous motor and the angular position of the rotor assigned to the determined instantaneous value.

2. The method according to claim 1, which further comprises providing the control element as an inverter.

3. The method according to claim 1, which further comprises providing the electric drive as a speed-regulated electric drive.

4. The method according to claim 3, which further comprises providing a field-oriented regulator for the speed-regulated electric drive.

5. The method according to claim 1, which further comprises the following steps:

dividing the overall angular range assigned to a complete rotation of the rotor into P consecutive angular sectors of equal size;

determining the greatest absolute value of the at least one instantaneous value of at least one of the electric phase currents of the three-phase AC synchronous motor for at least one full rotation of the rotor relative to the stator;

determining an angular sector to which the determined instantaneous value is assigned; and using the determined angular sector to determine the angular position of the rotor relative to the stator assigned to the determined instantaneous value.

6. The method according to claim 5, which further comprises using only one of the electric phase currents of the three-phase AC synchronous motor to determine the angular sector.

7. The method according to claim 5, which further comprises using an angle forming a boundary between the determined angular sector and its preceding angular sector as the angular position of the rotor relative to the stator assigned to the determined at least one instantaneous value.

8. The method according to claim 5, which further comprises the following steps:

determining the greatest absolute values of the instantaneous values for at least two of the electric phase currents of the three-phase AC synchronous motor only for the determined angular sector; and determining the angular position of the rotor relative to the stator assigned to the position of the piston based on the determined instantaneous values.

9. The method according to claim 5, which further comprises providing the electric drive as a speed-regulated electric drive with a field-oriented regulator for increasing a target current strength predetermined by the field-oriented regulator for the three-phase AC synchronous motor by a predefined value apart from for the angular sector to which the determined instantaneous value is assigned.

10. The method according to claim 1, which further comprises activating the three-phase AC synchronous motor to slow to a stop within less than a ¾ rotation of the three-phase AC synchronous motor, starting when the piston is in a position relative to the compressor chamber being assigned to the angular position of the rotor relative to the stator assigned to the determined at least one instantaneous value.

11. The method according to claim 10, which further comprises reducing the speed of the three-phase AC synchronous motor to a minimum speed before the three-phase AC synchronous motor slows down.

12. A domestic refrigeration appliance, comprising:

a heat-insulated body with a coolable inner container delimiting a coolable interior space for storing food;

a refrigerant circuit for cooling said coolable interior space, said refrigerant circuit including a coolant and a compressor;

an electric drive having a three-phase AC synchronous motor and a control element for activating said three-phase AC synchronous motor;

said compressor having a compressor chamber with an inlet and an outlet, a piston mounted displaceably within said compressor chamber, a crankshaft and said three-phase AC synchronous motor;

said three-phase AC synchronous motor including a number P of pole pairs greater than 1, a stator and a rotor coupled to said piston by said crankshaft, said rotor being mounted for rotation relative to said stator, permitting said three-phase AC synchronous motor to cause said piston to reduce a volume enclosed by said compressor chamber and said piston to compress said coolant upon operating said compressor; and an electronic control apparatus being configured to activate said electric drive for determining a position of said piston relative to said compressor chamber during operation of said compressor in an intended manner by:

determining a greatest absolute value of at least one instantaneous value of at least one electric phase current of said three-phase AC synchronous motor, for at least one full rotation of said rotor relative to said stator, determining an angular position of said rotor relative to said stator assigned to the determined instantaneous value, and determining the position of the piston relative to said compressor chamber based on a speed of said three-phase AC synchronous motor and the angular position of said rotor assigned to the determined instantaneous value.

13. The domestic refrigeration appliance according to claim 12, wherein said control element is an inverter.

* * * * *